United States Patent
Han et al.

(10) Patent No.: US 8,713,351 B2
(45) Date of Patent: Apr. 29, 2014

(54) MESSAGE PROCESSING METHOD AND APPARATUS BASED ON THE SIP PROTOCOL AND AN IP COMMUNICATION SYSTEM

(75) Inventors: Yinjun Han, Shenzhen (CN); Xinhua Jia, Shenzhen (CN); Yong Yang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 789 days.

(21) Appl. No.: 12/679,655

(22) PCT Filed: Dec. 18, 2007

(86) PCT No.: PCT/CN2007/003659
§ 371 (c)(1),
(2), (4) Date: Jun. 10, 2010

(87) PCT Pub. No.: WO2009/039695
PCT Pub. Date: Apr. 2, 2009

(65) Prior Publication Data
US 2010/0299551 A1    Nov. 25, 2010

(30) Foreign Application Priority Data
Sep. 24, 2007    (CN) .......................... 2007 1 0122373

(51) Int. Cl.
*G06F 11/00* (2006.01)
(52) U.S. Cl.
USPC .............. 714/4.1; 714/4.12; 714/49; 713/181
(58) Field of Classification Search
USPC .............................. 714/4.1, 4.12, 49; 713/181
See application file for complete search history.

(56) References Cited

U.S. PATENT DOCUMENTS

| 6,687,732 | B1 * | 2/2004 | Bector et al. ................... 709/200 |
| 7,000,013 | B2 * | 2/2006 | Mei et al. ....................... 709/223 |
| 7,197,565 | B2 * | 3/2007 | Abdelaziz et al. ............. 709/226 |

(Continued)

FOREIGN PATENT DOCUMENTS

| CN | 1863209 | 11/2006 |
| CN | 1953448 | 4/2007 |
| GB | 2425685 | 11/2006 |

OTHER PUBLICATIONS

PCT; International Search Report for PCT/CN2007/003659; Jul. 3, 2008.

*Primary Examiner* — Loan L. T. Truong
(74) *Attorney, Agent, or Firm* — Knobbe, Martens, Olson & Bear, LLP (57) ABSTRACT

The present invention provides a message processing method, apparatus based on the SIP Protocol and an IP communication system, wherein the method comprises: a step for processing messages from a core network, for using a SIP proxy server as a uniform access interface for SIP messages from the core network to judge and distribute the received SIP messages to corresponding application servers for processing; a step for processing messages from the application servers, for using the SIP proxy server as a uniform access interface for SIP messages from the application servers to distribute, according to instructions from the application servers, the received SIP messages to corresponding core network device for processing. Thus, with the method and system of the present invention, when the processing capability of one application server is not enough, the processing capability of the application server could be improved by expanding the number of the application servers without any need to perform modification of the configuration by the core network device.

16 Claims, 3 Drawing Sheets

(56) References Cited

U.S. PATENT DOCUMENTS

| | | | |
|---|---|---|---|
| 7,209,953 B2* | 4/2007 | Brooks | 709/206 |
| 7,603,316 B1* | 10/2009 | Fife et al. | 705/44 |
| 7,630,372 B1* | 12/2009 | Androski et al. | 370/392 |
| 7,640,030 B2* | 12/2009 | Cai et al. | 455/466 |
| 7,680,037 B2* | 3/2010 | Cortes et al. | 370/230 |
| 7,826,603 B1* | 11/2010 | Denman et al. | 379/202.01 |
| 8,051,189 B2* | 11/2011 | Onorato et al. | 709/230 |
| 8,060,597 B2* | 11/2011 | Wang et al. | 709/223 |
| 2002/0174219 A1* | 11/2002 | Mei et al. | 709/224 |
| 2002/0184376 A1* | 12/2002 | Sternagle | 709/230 |
| 2003/0058839 A1* | 3/2003 | D'Souza | 370/352 |
| 2003/0233457 A1 | 12/2003 | Basilier et al. | |
| 2004/0111492 A1* | 6/2004 | Nakahara et al. | 709/219 |
| 2004/0123159 A1* | 6/2004 | Kerstens et al. | 713/202 |
| 2006/0034195 A1* | 2/2006 | Blaiotta et al. | 370/261 |
| 2006/0105766 A1* | 5/2006 | Azada et al. | 455/432.1 |
| 2006/0155814 A1* | 7/2006 | Bennett et al. | 709/207 |
| 2006/0165064 A1* | 7/2006 | Brown et al. | 370/352 |
| 2006/0198309 A1* | 9/2006 | Cortes et al. | 370/241 |
| 2006/0229093 A1* | 10/2006 | Bhutiani et al. | 455/518 |
| 2007/0043872 A1* | 2/2007 | Pattan et al. | 709/227 |
| 2007/0047558 A1 | 3/2007 | Ayers et al. | |
| 2007/0100981 A1* | 5/2007 | Adamczyk et al. | 709/223 |
| 2007/0136413 A1* | 6/2007 | Ishikawa et al. | 709/200 |
| 2007/0276947 A1* | 11/2007 | Panattu et al. | 709/227 |
| 2007/0280453 A1* | 12/2007 | Kelley et al. | 379/201.01 |
| 2007/0291734 A1* | 12/2007 | Bhatia et al. | 370/352 |
| 2007/0293228 A1* | 12/2007 | Guoqing | 455/450 |
| 2008/0052400 A1* | 2/2008 | Ekberg | 709/227 |
| 2008/0072264 A1* | 3/2008 | Crayford | 725/86 |
| 2008/0075261 A1* | 3/2008 | Ramanathan et al. | 379/220.01 |
| 2008/0080698 A1* | 4/2008 | Williams et al. | 379/266.1 |
| 2008/0098091 A1* | 4/2008 | Benco et al. | 709/219 |
| 2008/0114690 A1* | 5/2008 | Skidmore et al. | 705/52 |
| 2008/0212499 A1* | 9/2008 | Maes | 370/265 |
| 2008/0261593 A1* | 10/2008 | Wong et al. | 455/435.1 |
| 2008/0281971 A1* | 11/2008 | Leppanen et al. | 709/228 |
| 2008/0288458 A1* | 11/2008 | Sun et al. | 707/3 |
| 2009/0013078 A1* | 1/2009 | Bencheikh | 709/227 |
| 2009/0262724 A1* | 10/2009 | Suzuki et al. | 370/352 |
| 2010/0091763 A1* | 4/2010 | Thompson | 370/352 |
| 2010/0281535 A1* | 11/2010 | Perry et al. | 726/22 |
| 2011/0103340 A1* | 5/2011 | Zhu et al. | 370/329 |
| 2011/0243149 A1* | 10/2011 | Xie | 370/410 |
| 2012/0155457 A1* | 6/2012 | Yi et al. | 370/352 |
| 2013/0308450 A1* | 11/2013 | Zhou et al. | 370/230 |

* cited by examiner

MESSAGE PROCESSING METHOD AND APPARATUS BASED ON THE SIP PROTOCOL AND AN IP COMMUNICATION SYSTEM

CROSS-REFERENCE TO RELATED APPLICATIONS

This application is the U.S. National Phase application under 35 U.S.C. §371 of International Application PCT/CN2007/003659 filed Dec. 18, 2007, which claims priority to Chinese Application 200710122373.6 filed Sep. 24, 2007. The entirety of the two of these applications is hereby incorporated by reference.

FILED OF THE INVENTION

The present invention relates to a session message processing method in the IP communication network, in particular to a message processing method and apparatus based on the Session Initialization Protocol (SIP for short), in the Next Generation Network (NGN for short) or the IP Multimedia System (IMS for short) network and an IP communication system which uses the method and the apparatus.

BACKGROUND OF THE INVENTION

In the NGN network or the IMS network, an application server (AS for short) is located on a core network for processing complicated service logic control. The performance of the application server is affected by the complexity of the service logic and the frequency of database access. As the processing capability of one application server is limited, when the traffic is increased continuously, the number of the application servers needs to be expanded so as to enhance the processing performance of the application server. From the perspective of the core network, an increase in the number of the application servers is bound to bring forth an increase in the number of the IP addresses for the application servers, and changes in the network topological structure and in the user distribution. If the processing capability of the application server can be improved without any modification of the configuration of the core network device, the problems of the performance bottleneck and the capacity expansion of the application server will be settled effectively. Thus, the present invention is proposed to settle these problems.

SUMMARY OF THE INVENTION

The technical problem to be solved by the present invention is to provide a message processing method and apparatus based on the SIP Protocol and an IP communication system so as to achieve distributed implementation of large-capacity application servers in the NGN network or the IMS network, wherein the capacity expansion and upgrading of the application server do not require any modification of the configuration of the core network device, and at the same time, the stability and robustness of the application server are improved.

In order to achieve the above mentioned objects, the message processing method based on the SIP Protocol provided in the present invention is used in a message processing system including a number of application servers and core network devices, the method including:

a step for processing messages from a core network, for using a SIP proxy server as a uniform access interface for SIP messages from the core network to judge and distribute the received SIP messages to corresponding application servers for processing;

a step for processing messages from the application servers, for using the SIP proxy server as a uniform access interface for SIP messages from the application servers to distribute, according to instructions from the application servers, the received SIP messages to corresponding core network devices for processing.

Before the step for processing the messages from the core network and the step for processing the messages from the application servers, the message processing method based on the SIP Protocol further comprises a step of judging whether a message is from the core network or from an application server after the message is received from a network layer by a SIP proxy server, if the message is from the core network, the step for processing the messages from the core network is performed; otherwise, the step for processing the messages from the application servers is performed.

In the message processing method based on the SIP protocol, the step for processing the messages from the core network further comprises a step of judging whether a to-header in the message contains a tag parameter, and whether the message is a request message, if the to-header in the message does not contain a tag parameter and the message is a request message, the SIP proxy server distributes the message to a corresponding application server according to a pre-configured message distribution strategy, and simultaneously adds a sign indicating which core network device the message is from at the end of the message; and if the to-header in the message contains a tag parameter or the message is a response message, a further step is taken to judge whether the tag parameter in the to-header in the message contains identification information of the application server.

In the message processing method based on the SIP protocol, regarding the step of judging whether the tag parameter in the to-header in the message contains identification information of the application server, if yes, the SIP proxy server distributes the message to a corresponding application server, and simultaneously adds a sign indicating which core network device the message is from at the end of the message; otherwise, a further step is taken to judge whether a tag parameter in a from-header in the message contains an application server identifier.

In the message processing method based on the SIP protocol, regarding the step of judging whether the tag parameter in the from-header in the message contains an application server identifier, if yes, the SIP proxy server distributes the message to a corresponding application server, and simultaneously adds a sign indicating which core network device the message is from at the end of the message; otherwise, the message is discarded.

The message processing method based on the SIP protocol further comprises an application server survival detection step, performed through the SIP proxy server, for detecting failure of an application server, and transferring the traffic of the application server in failure to other application servers.

The message processing method based on the SIP protocol further comprises a step of adjusting distribution strategy, performed through the SIP proxy server, for sensing the performance of an application server according to the results of the survival detection, and dynamically adjusting the distribution strategy of the application server according to the performance parameters of the application server.

Further, the present invention also provides a message processing apparatus using the message processing method based on the SIP protocol, comprising a number of application servers and a SIP proxy server, wherein the SIP proxy server, as a uniform access interface, receives SIP messages from a core network or application servers, and distributes the SIP messages to corresponding application servers or core network devices for processing after judging the SIP messages.

In the message processing apparatus based on the SIP protocol, the SIP proxy server is further used for detecting failure of an application server, and transferring the traffic of the application server in failure to other application servers.

In the message processing apparatus based on the SIP protocol, the SIP proxy server is further used for sensing the performance of the application server according to the results of the failure detection, and dynamically adjusting the distribution strategy of the application server according to the performance parameters of the application server.

Still further, the present invention further provides an IP communication system using the above mentioned method and apparatus, the IP communication system comprises a message processing apparatus based on the SIP protocol, wherein, the apparatus comprises a number of application servers and a SIP proxy server, the SIP proxy server, as a uniform access interface, receives SIP messages from a core network or application servers, and distributes the SIP messages to corresponding application servers or core network devices for processing after judging the SIP messages.

Compared to the existing technology, the present invention achieves message interaction between a core network and application servers by adding a SIP proxy server as a uniform access interface. When the processing capability of one application server is not enough, the processing capability of the application server is improved by expanding the number of the application servers without any need to perform modification of the configuration of the core network devices, which effectively solves the problems of performance bottleneck and capacity expansion of the application server. Meanwhile, the SIP proxy server in the present invention can also achieve the function of fault tolerance and redundancy of the application server, which realizes high reliability of the application server.

DETAILED DESCRIPTION OF THE EMBODIMENTS

The technical solution of the present invention will be described hereinafter in detail in conjunction with the drawings thereof and embodiments for a further understanding the object, solution, and effect of the present invention. However, the embodiments and the description thereof shall not be construed as undue restrictions to the scope of the claims of the present invention.

Figure 1:
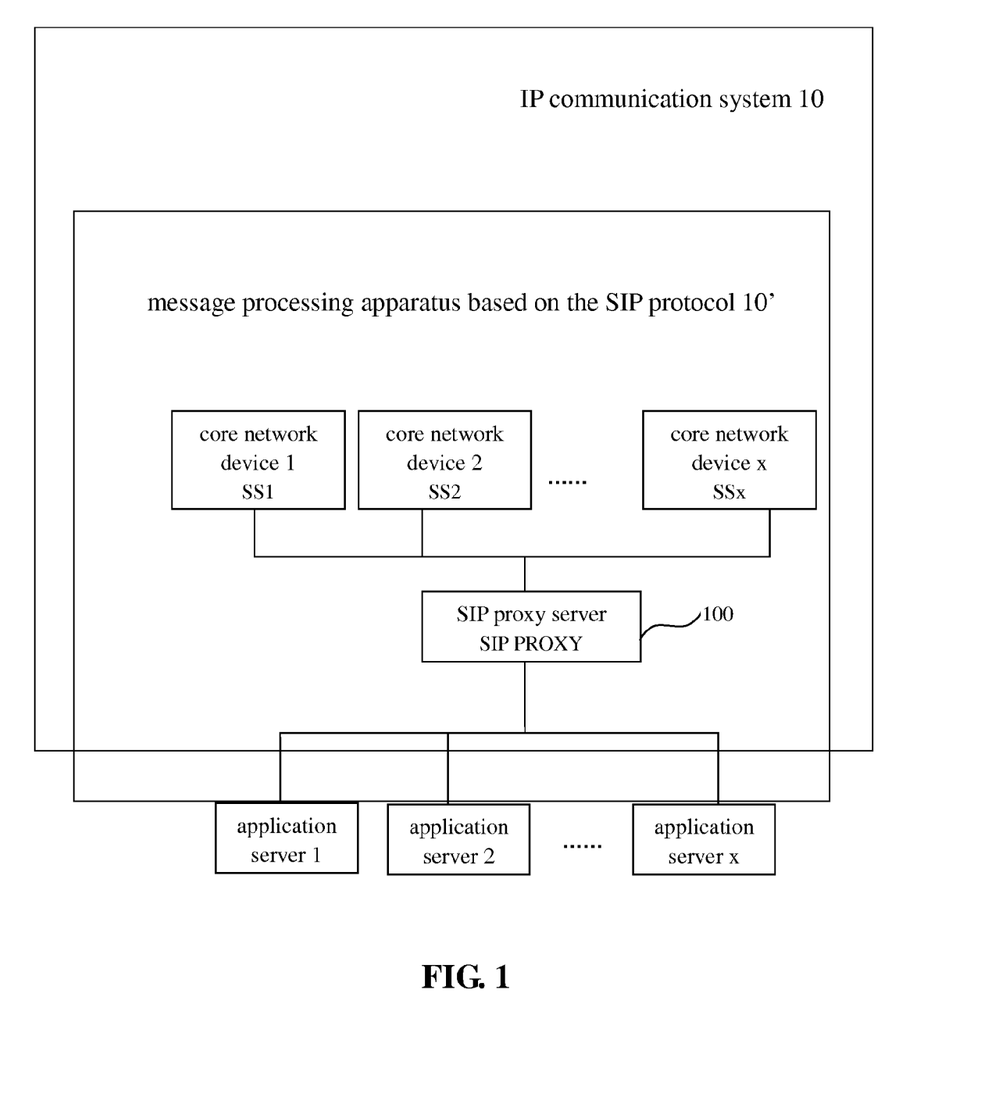
FIG. 1 is an architecture schematic diagram of a message processing system based on the SIP protocol in an IP communication system according to the present invention.

Referring to FIG. 1 which is an architecture schematic diagram of a message processing system based on the SIP protocol in an IP communication system 10 according to the present invention, the IP communication system 10 comprises a message processing apparatus 10' based on the SIP protocol. At the front end, a SIP proxy server 100 (SIP PROXY) connected with multiple core network devices 1, 2 . . . x acts as a SIP signaling distribution device, and at the rear end of the SIP proxy server 100, there are a number of application servers (AppServer) 1, 2 . . . x for processing SIP signaling and service logic. What is transmitted between the core network devices and the SIP proxy server 100 is standard SIP signaling. Based on the standard SIP signaling, some specific private fields are added in the signaling transmitted between the SIP proxy server 100 and the application servers. The SIP proxy server 100 does not process SIP messages, but just performs simple judgment and distribution according to received SIP messages, including distribution to different application servers and core network devices, wherein the distribution is based on special fields in the SIP signaling, such as a called number, a calling number, Call-ID, and an address of the core network device. The SIP proxy server 100 has neither state nor data area, thus it has a simple processing procedure and a high performance, and is not affected or slightly affected by call traffic. On the contrary, an application server needs to process SIP signaling, service logic, and database access, and when the call traffic is increased, the number of application servers needs to be increased to achieve corresponding processing performance. The present invention achieves message interaction between the application servers and the core network devices by adding a SIP proxy server 100 as a uniform access interface, and realizes large capacity distribution of the application servers, which can effectively settle the problems of performance bottleneck and capacity expansion of the application server.

Figure 2:
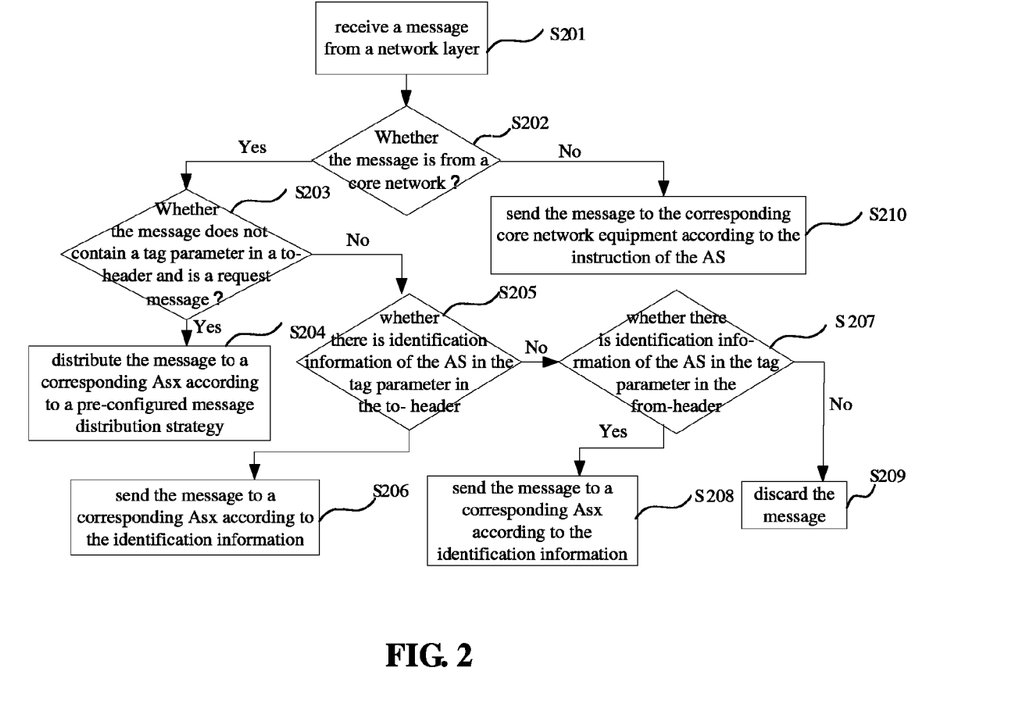
FIG. 2 is a flow chart of a message processing method based on the SIP protocol according to the present invention.

Referring to FIG. 2, a message processing flow based on the SIP protocol according to the present invention is further described:

Step S201, the SIP proxy server 100 receives a message from a network layer;

Step S202, it is judged whether the message is from a core network or an application server, if the message is from a core network, Step S203 is performed, and if the message is from an application server, Step S210 is performed.

Step S203, it is judged whether a to-header in the message from the core network contains a tag parameter and whether the message is a request message;

Step S204, if the to-header in the message does not contain a tag parameter and the message is a request message, the SIP proxy server 100 distributes the SIP request to a specified application server according to a pre-configured message distribution strategy;

Step S205, if the to-header in the message contains a tag parameter or if the message is a response message, it is checked whether the tag parameter in the to-header contains identification information of the application server;

Step S206, if the tag parameter in the to-header contains identification information of the application server, the message is directly distributed to the application server according to the identification information, and a sign indicating from which core network device the message is received is added at the end of the message simultaneously;

Step S207, if the tag parameter in the to-header does not contain identification information of the application server, it is checked whether a tag parameter in a from-header in the message contains identification information of the application server;

Step S208, if the tag parameter in the from-header contains identification information of the application server, the message is directly distributed to the application server according to the identification information, and a sign indicating from which core network device the message is received is added at the end of the message simultaneously;

Step S209, if the tag parameter in the from-header does not contain identification information of the application server, the message is discarded without any processing;

Step S210, the SIP proxy server 100 receives the message from an application server, and sends the message to corresponding core network device according to an instruction from the application server.

The above mentioned message processing procedure is further explained as follows. Upon the receipt of a message from a core network, the SIP proxy server 100 first judges whether the to-header contains a tag parameter, if the to-header does not contain a tag parameter and the message is a request message, which indicates that the message is a message outside a session, the SIP proxy server 100 distributes the SIP message to a corresponding application server according to a pre-configured message distribution algorithm. In response, the application server will place the identifier of the application server in the tag parameter in the to-header in the generated message. For messages within a SIP session, the tag parameters in the to-headers are the same. As a consequence, upon receipt of a message within a session, the SIP proxy server 100 could realize distribution of the message only according to the tag parameter in the to-header. Similarly, upon receipt of a request initiatively started by an application server, the application server will place its identifier in a tag parameter in the from-header in the message. For messages within a SIP session, the tag parameters in the from-headers are the same. As a consequence, upon receipt of a message within a session, the SIP proxy server 100 could realize distribution of the message only according to the tag parameter in the from-header. Thus, the SIP proxy server 100 could realize distribution of a message within a session according to the tag parameter in the to-header or the tag parameter in the from-header in the message. Upon receipt of a request message without a tag parameter in the to-header, which indicates that the message is a message outside a session, the SIP proxy server 100 could realize distribution of the message to different application servers according to the message distribution strategy so as to achieve service load balance.

The distribution algorithm in the SIP proxy server 100 is configurable. The SIP proxy server can also perform survival detection for an application server, sense the performance of the application server according to the result of the detection, and thus dynamically adjust the distribution strategy for the application server based on the performance parameters of the application server. If the SIP proxy server detects a failure in one application server, it can transfer the traffic of the application server to other application servers to achieve fault tolerance and call redundancy.

Figure 3:
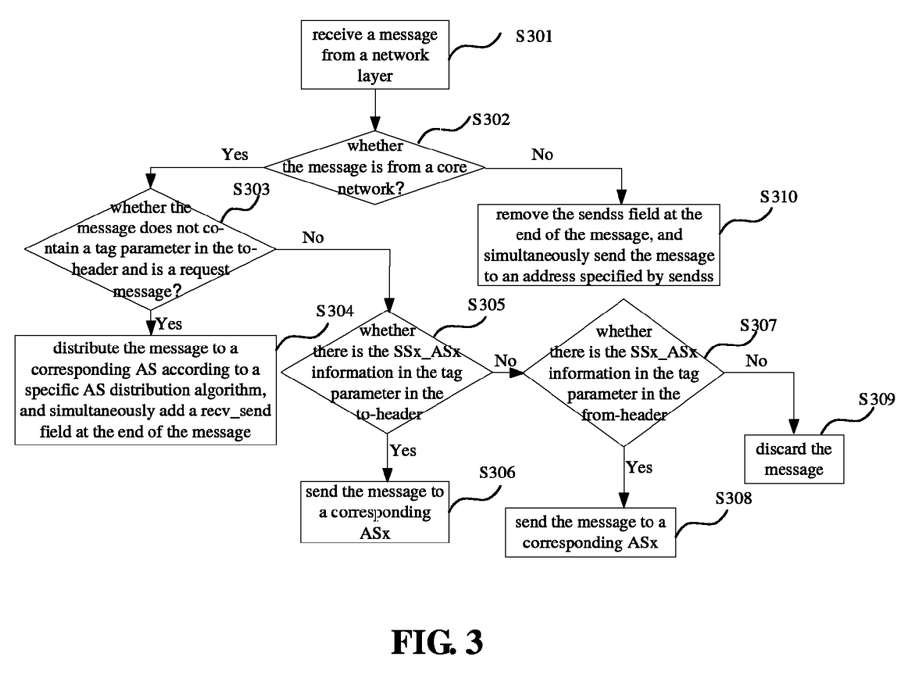
FIG. 3 is a flow chart of an embodiment of the message processing method based on the SIP protocol according to the present invention.

Referring to FIG. 3, the message processing method based on the SIP Protocol according to the present invention is further explained according to an embodiment.

Step S301, the SIP proxy server 100 receives a message from a network layer;

Step S302, the SIP proxy server 100 further judges whether the message is from a core network, if the message is from a core network, Step S303 is performed, otherwise, Step S310 is performed to remove the "sendss" character at the end of the message, and simultaneously sends the message to the address specified by the "sends".

Step S303, the SIP proxy server 100 further judges whether the to-header in the message from the core network contains a tag parameter, and whether the message is a request message;

Step S304, if the to-header in the message does not contain a tag parameter and the message is a request message, the message is distributed to a corresponding application server based on a specific application server distribution algorithm, and simultaneously a recv_send field is added at the end.

Step S305, if the to-header in the message contains a tag parameter, or if the message is a response message, it is checked whether the tag parameter in the to-header contains SSx_ASx information;

Step S306, if the tag parameter in the to-header contains SSx_ASx information, the message is distributed to corresponding ASx;

Step S307, if the tag parameter in the to-header does not contain SSx_ASx information, it is checked whether the tag parameter in the from-header in the message contains SSx_ASx information;

Step S308, if the tag parameter in the from-header contains SSx_ASx information, the message is distributed to corresponding ASx;

Step S309, if the tag parameter in the from-header does not contain SSx_ASx information, the message is discarded.

With the method and system of the present invention, when the processing capability of one application server is not enough, the processing capability of the application server could be improved by expanding the number of the application servers, and there is no need to make any modification of the configuration of the core network devices. Meanwhile, the SIP proxy server in the present invention detects, through a heartbeat message between the SIP proxy server and an application server, the processing capability and survival of the server to realize the capability of load sharing, fault tolerance and redundancy between the application servers. Further, the SIP proxy server system provided in the present invention provides a variety of information distribution abilities, and can achieve flexible message distribution. The present invention is proved to be of superior effect in practical application. When the system is tested on a minicomputer with a CPU of 1.80 GHZ and a memory of 1.0 G, 1024 caps of calls occupy about 19.1% of the CPU. However, regarding a single application server, when 150 caps of calls are processed on a minicomputer with a CPU of 1.80 GHZ and a memory of 1.0 G, 80% of the CPU is occupied. In this case, the problems of capacity expansion and reliability of the application server can be settled by expanding the number of the application servers.

The present invention is disclosed by a preferable embodiment as above, but it is not used to restrict the present invention. For those skilled in the art, the present invention may have various changes and variations, without departure from the spirit and principle of the present invention. However, these changes and variations are all included in the scope of the claims of the present invention.

What is claimed is:

1. A message processing method based on the SIP Protocol for a message processing system including a number of application servers and core network devices, comprising:
   a step of processing messages from a core network, of using a SIP proxy server as a uniform access interface for SIP messages from the core network to judge and distribute the received SIP messages to corresponding application servers for processing;
   a step of processing messages from the application servers, of using the SIP proxy server as a uniform access interface for SIP messages from the application servers to distribute, according to instructions from the application servers, the received SIP messages to corresponding core network devices for processing, wherein the method further comprises an application server survival detection step, performed through the SIP proxy server, for detecting failure of an application server and transferring the traffic of the application server in the event of failure to other application servers, and wherein the step for processing the messages from the core network further comprises judging whether a to-header in the message contains a tag parameter, and whether the message is a request message, if the to-header in the message does not contain a tag parameter and the message is a request message, the SIP proxy server distributes the message to a corresponding application server according to a pre-configured message distribution strategy, and simultaneously adds a sign indicating which core network device the message is from at the end of the message, and if the to-header in the message contains a tag parameter or the message is a response message, a further step is taken to judge whether the tag parameter in the to-header in the message contains identification information of the application server.

2. The message processing method based on the SIP Protocol according to claim 1, wherein, before the step of processing the messages from the core network and the step of processing the messages from the application servers, the method further comprises:

a step of judging whether a message is from the core network or from an application server after the message is received from a network layer by the SIP proxy server, if the message is from the core network, performing the step of processing the messages from the core network, otherwise, performing the step of processing the messages from the application servers.

3. The message processing method based on the SIP Protocol according to claim 1, wherein, regarding the step of judging whether the tag parameter in the to-header in the message contains identification information of the application server, if yes, the SIP proxy server distributes the message to a corresponding application server, and simultaneously adds a sign indicating which core network device the message is from at the end of the message; otherwise, a further step is taken to judge whether a tag parameter in a from-header in the message contains an application server identifier.

4. The message processing method based on the SIP Protocol according to claim 3, wherein, regarding the step of judging whether the tag parameter in the from-header in the message contains an application server identifier, if yes, the SIP proxy server distributes the message to a corresponding application server, and simultaneously adds a sign indicating which core network device the message is from at the end of the message; otherwise, the message is discarded.

5. The message processing method based on the SIP Protocol according to claim 1, wherein, the method further comprises a step of adjusting distribution strategy, performed through the SIP proxy server, of sensing the performance of the application server according to the results of the survival detection, and dynamically adjusting the distribution strategy of the application server according to the performance parameters of the application server.

6. A message processing apparatus using the message processing method based on the SIP protocol according to claim 1, comprising a number of application servers and a SIP proxy server, wherein the SIP proxy server, as a uniform access interface, receives SIP messages from a core network or application servers, and distributes the SIP messages to corresponding application servers or core network devices for processing after judging the SIP messages, wherein the SIP proxy server is further used for detecting failure of an application server, and transferring the traffic of the application server in the event of failure to other application servers, and wherein the SIP proxy server is further used for performing following steps for processing the messages from the core network: judging whether a to-header in the message contains a tag parameter, and whether the message is a request message, if the to-header in the message does not contain a tag parameter and the message is a request message, the SIP proxy server distributing the message to a corresponding application server according to a pre-configured message distribution strategy, and simultaneously adding a sign indicating which core network device the message is from at the end of the message, and if the to-header in the message contains a tag parameter or the message is a response message, further judging whether the tag parameter in the to-header in the message contains identification information of the application server.

7. The message processing apparatus based on the SIP protocol according to claim 6 wherein, the SIP proxy server is further used for sensing the performance of the application server according to the results of the failure detection, and dynamically adjusting the distribution strategy of the application server according to the performance parameters of the application server.

8. An IP communication system using the message processing method based on the SIP protocol according to claim 1, comprising a message processing apparatus based on the SIP protocol wherein, the apparatus comprises a number of application servers and a SIP proxy server, the SIP proxy server, as a uniform access interface, receives SIP messages from a core network or application servers, and distributes the SIP messages to corresponding application servers or core network devices for processing after judging the SIP messages, wherein the SIP proxy server is further used for detecting failure of an application server, and transferring the traffic of the application server in the event of failure to other application servers, and wherein the SIP proxy server is further used for performing following steps for processing the messages from the core network: judging whether a to-header in the message contains a tag parameter, and whether the message is a request message, if the to-header in the message does not contain a tag parameter and the message is a request message, the SIP proxy server distributing the message to a corresponding application server according to a pre-configured message distribution strategy, and simultaneously adding a sign indicating which core network device the message is from at the end of the message, and if the to-header in the message contains a tag parameter or the message is a response message, further judging whether the tag parameter in the to-header in the message contains identification information of the application server.

9. A message processing apparatus using the message processing method based on the SIP protocol according to claim 2, comprising a number of application servers and a SIP proxy server, wherein the SIP proxy server, as a uniform access interface, receives SIP messages from a core network or application servers, and distributes the SIP messages to corresponding application servers or core network devices for processing after judging the SIP messages, wherein the SIP proxy server is further used for detecting failure of an application server, and transferring the traffic of the application server in the event of failure to other application servers, and wherein the SIP proxy server is further used for performing following steps for processing the messages from the core network: judging whether a to-header in the message contains a tag parameter, and whether the message is a request message, if the to-header in the message does not contain a tag parameter and the message is a request message, the SIP proxy server distributing the message to a corresponding application server according to a pre-configured message distribution strategy, and simultaneously adding a sign indicating which core network device the message is from at the end of the message, and if the to-header in the message contains a tag parameter or the message is a response message, further judging whether the tag parameter in the to-header in the message contains identification information of the application server.

10. A message processing apparatus using the message processing method based on the SIP protocol according to claim 1, comprising a number of application servers and a SIP proxy server, wherein the SIP proxy server, as a uniform access interface, receives SIP messages from a core network or application servers, and distributes the SIP messages to corresponding application servers or core network devices for processing after judging the SIP messages, wherein the SIP proxy server is further used for detecting failure of an application server, and transferring the traffic of the application server in the event of failure to other application servers, and wherein the SIP proxy server is further used for performing following steps for processing the messages from the core network: judging whether a to-header in the message contains a tag parameter, and whether the message is a request message, if the to-header in the message does not contain a tag parameter and the message is a request message, the SIP proxy server distributing the message to a corresponding application server according to a pre-configured message distribution strategy, and simultaneously adding a sign indicating which core network device the message is from at the end of the message, and if the to-header in the message contains a tag parameter or the message is a response message, further judging whether the tag parameter in the to-header in the message contains identification information of the application server.

11. A message processing apparatus using the message processing method based on the SIP protocol according to claim 3, comprising a number of application servers and a SIP proxy server, wherein the SIP proxy server, as a uniform access interface, receives SIP messages from a core network or application servers, and distributes the SIP messages to corresponding application servers or core network devices for processing after judging the SIP messages, wherein the SIP proxy server is further used for detecting failure of an application server, and transferring the traffic of the application server in the event of failure to other application servers, and wherein the SIP proxy server is further used for performing following steps for processing the messages from the core network: judging whether a to-header in the message contains a tag parameter, and whether the message is a request message, if the to-header in the message does not contain a tag parameter and the message is a request message, the SIP proxy server distributing the message to a corresponding application server according to a pre-configured message distribution strategy, and simultaneously adding a sign indicating which core network device the message is from at the end of the message, and if the to-header in the message contains a tag parameter or the message is a response message, further judging whether the tag parameter in the to-header in the message contains identification information of the application server.

12. A message processing apparatus using the message processing method based on the SIP protocol according to claim 4, comprising a number of application servers and a SIP proxy server, wherein the SIP proxy server, as a uniform access interface, receives SIP messages from a core network or application servers, and distributes the SIP messages to corresponding application servers or core network devices for processing after judging the SIP messages, wherein the SIP proxy server is further used for detecting failure of an application server, and transferring the traffic of the application server in the event of failure to other application servers, and wherein the SIP proxy server is further used for performing following steps for processing the messages from the core network: judging whether a to-header in the message contains a tag parameter, and whether the message is a request message, if the to-header in the message does not contain a tag parameter and the message is a request message, the SIP proxy server distributing the message to a corresponding application server according to a pre-configured message distribution strategy, and simultaneously adding a sign indicating which core network device the message is from at the end of the message, and if the to-header in the message contains a tag parameter or the message is a response message, further judging whether the tag parameter in the to-header in the message contains identification information of the application server.

13. An IP communication system using the message processing method based on the SIP protocol according to claim 2, comprising a message processing apparatus based on the SIP protocol, wherein, the apparatus comprises a number of application servers and a SIP proxy server, the SIP proxy server, as a uniform access interface, receives SIP messages from a core network or application servers, and distributes the SIP messages to corresponding application servers or core network devices for processing after judging the SIP messages, wherein the SIP proxy server is further used for detecting failure of an application server, and transferring the traffic of the application server in the event of failure to other application servers, and wherein the SIP proxy server is further used for performing following steps for processing the messages from the core network: judging whether a to-header in the message contains a tag parameter, and whether the message is a request message, if the to-header in the message does not contain a tag parameter and the message is a request message, the SIP proxy server distributing the message to a corresponding application server according to a pre-configured message distribution strategy, and simultaneously adding a sign indicating which core network device the message is from at the end of the message, and if the to-header in the message contains a tag parameter or the message is a response message, further judging whether the tag parameter in the to-header in the message contains identification information of the application server.

14. An IP communication system using the message processing method based on the SIP protocol according to claim 1, comprising a message processing apparatus based on the SIP protocol, wherein, the apparatus comprises a number of application servers and a SIP proxy server, the SIP proxy server, as a uniform access interface, receives SIP messages from a core network or application servers, and distributes the SIP messages to corresponding application servers or core network devices for processing after judging the SIP messages, wherein the SIP proxy server is further used for detecting failure of an application server, and transferring the traffic of the application server in the event of failure to other application servers, and the SIP proxy server is further used for performing following steps for processing the messages from the core network: judging whether a to-header in the message contains a tag parameter, and whether the message is a request message, if the to-header in the message does not contain a tag parameter and the message is a request message, the SIP proxy server distributing the message to a corresponding application server according to a pre-configured message distribution strategy, and simultaneously adding a sign indicating which core network device the message is from at the end of the message, and if the to-header in the message contains a tag parameter or the message is a response message, further judging whether the tag parameter in the to-header in the message contains identification information of the application server.

15. An IP communication system using the message processing method based on the SIP protocol according to claim 3, comprising a message processing apparatus based on the SIP protocol, wherein, the apparatus comprises a number of application servers and a SIP proxy server, the SIP proxy server, as a uniform access interface, receives SIP messages from a core network or application servers, and distributes the SIP messages to corresponding application servers or core network devices for processing after judging the SIP messages, wherein the SIP proxy server is further used for detecting failure of an application server, and transferring the traffic of the application server in the event of failure to other application servers, and wherein the SIP proxy server is further used for performing following steps for processing the messages from the core network: judging whether a to-header in the message contains a tag parameter, and whether the message is a request message, if the to-header in the message does not contain a tag parameter and the message is a request message, the SIP proxy server distributing the message to a corresponding application server according to a pre-configured message distribution strategy, and simultaneously adding a sign indicating which core network device the message is from at the end of the message, and if the to-header in the message contains a tag parameter or the message is a response message, further judging whether the tag parameter in the to-header in the message contains identification information of the application server.

16. An IP communication system using the message processing method based on the SIP protocol according to claim 4, comprising a message processing apparatus based on the SIP protocol, wherein, the apparatus comprises a number of application servers and a SIP proxy server, the SIP proxy server, as a uniform access interface, receives SIP messages from a core network or application servers, and distributes the SIP messages to corresponding application servers or core network devices for processing after judging the SIP messages, wherein the SIP proxy server is further used for detecting failure of an application server, and transferring the traffic of the application server in the event of failure to other application servers, and wherein the SIP proxy server is further used for performing following steps for processing the messages from the core network: judging whether a to-header in the message contains a tag parameter, and whether the message is a request message, if the to-header in the message does not contain a tag parameter and the message is a request message, the SIP proxy server distributing the message to a corresponding application server according to a pre-configured message distribution strategy, and simultaneously adding a sign indicating which core network device the message is from at the end of the message, and if the to-header in the message contains a tag parameter or the message is a response message, further judging whether the tag parameter in the to-header in the message contains identification information of the application server.

* * * * *